Dec. 13, 1949 S. T. COUCH 2,491,034
DRIVING WHEEL CARRIER
Filed Feb. 12, 1946 2 Sheets-Sheet 1

INVENTOR.
Seth T. Couch
BY William D. Booth Jr.
Attorney.

Dec. 13, 1949    S. T. COUCH    2,491,034
DRIVING WHEEL CARRIER
Filed Feb. 12, 1946    2 Sheets-Sheet 2

INVENTOR.
Seth T. Couch
BY William J. Barth Jr.
Attorney.

Patented Dec. 13, 1949

2,491,034

UNITED STATES PATENT OFFICE 2,491,034

DRIVING WHEEL CARRIER

Seth T. Couch, Sparks, Nev.

Application February 12, 1946, Serial No. 647,056

4 Claims. (Cl. 105—215)

The present invention relates to a carrier or truck for lifting locomotive driving wheels and moving them around a shop area.

The driving wheel assembly, when removed from a steam locomotive, is difficult to move about because of its size and weight and the unbalance caused by the counter-weights. The assembly consists of two driving wheels rigidly mounted on an axle, and while it can be rolled along a track, such practice is dangerous because the unbalanced counter-weights make the assembly roll with a jerky motion which is hard to control.

The principal object of the present invention is to provide a truck which carries the driving wheel assembly and which itself is provided with wheels, either flanged to run on standard gauge track, or flat tread to run on smooth ground or pavement. Another object is to provide a carrier equipped with means for raising the driving wheel assembly off the rails. A further object is to provide a carrier which is simple to construct, easy to apply to the driving wheels, and safe to operate. Still further objects and advantages of the invention will be apparent from the following specification, which should be read with the understanding that changes, within the limits of the claims, may be made in the form, construction and arrangement of the several parts herein described and illustrated, without departing from the spirit of the invention.

A typical embodiment of the invention is illustrated in the accompanying drawings, wherein Fig. 1 is a side elevation of the carrier in operative position, supporting a driving wheel assembly.

Figure 1:
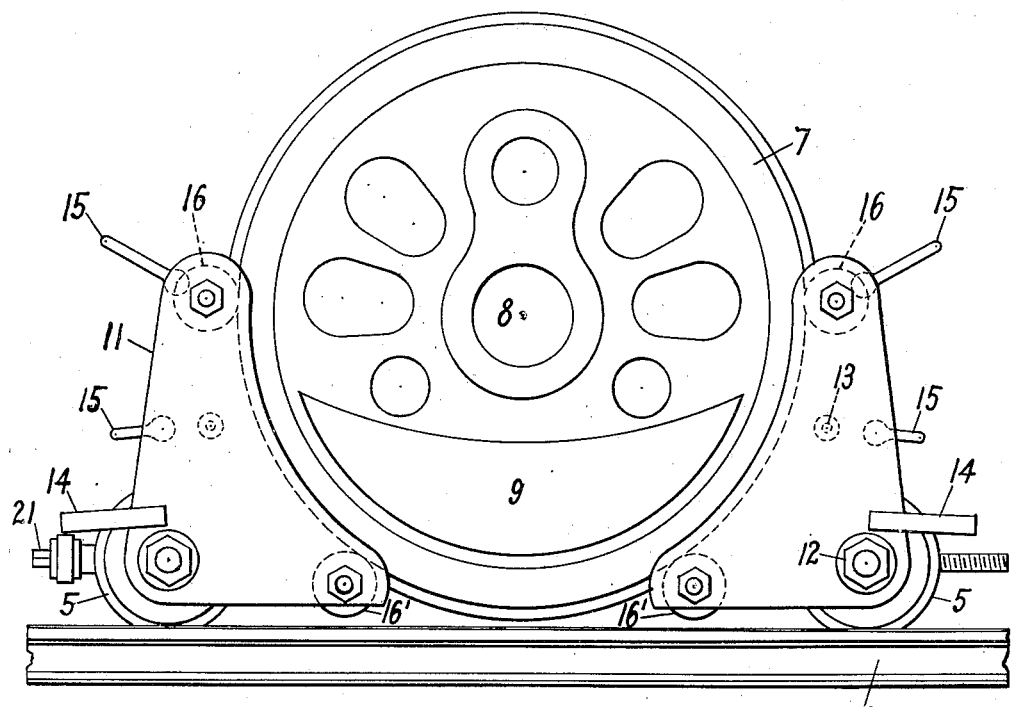

The carrier herein shown and described is provided with flanged wheels 5 to roll on the rails 6 of a standard gauge track. It is to be understood, however, that the flanged wheels may be replaced with flat tread wheels to roll on the ground or pavement. Although only one locomotive driving wheel 7 appears in Fig. 1, it is understood that the assembly for which the carrier is designed consists of a pair of such driving wheels rigidly mounted on an axle, according to customary practice. The end of the axle appears at 8 in Fig. 1. One of the counter-weights, which causes the unbalance previously referred to, when the assembly is rolled on the track without the carrier, is shown at 9.

The complete carrier consists of two two-wheeled dollies which are identical (with one minor exception hereinafter noted) but reversed in position, and two connecting rods. For clarity, the dolly shown at the left in Figs. 1, 2 and 3 will be termed the front dolly, and that at right the rear dolly. Each dolly comprises an axle, designated 10 in the front dolly and 10' in the rear dolly, on which the two supporting wheels 5 are rotatably mounted, and two substantially triangular side frames, each formed of a pair of spaced plates 11, also rotatably mounted on the axle, one plate of each pair being inside and the other outside the wheels 5. Nuts 12, screwed on the ends of the axle against suitable shoulders (not shown), hold the wheels 5 and plates 11 in place. A transverse rod 13, rigidly connected with all four plates 11 above the axle, holds said plates in position and ties them together to form a rigid frame. U-shaped steel straps 14, one leg of each being welded to each plate 11 of the pair, further strengthen said plates and hold them in position. Transverse rods 15, having their ends welded to the inside plates at opposite sides of the frame, additionally brace the structure and also serve as hand holds for use in pushing and pulling the carrier about. Two such rods 15 are shown attached to each dolly, although more or less may be provided as desired.

Figure 2:
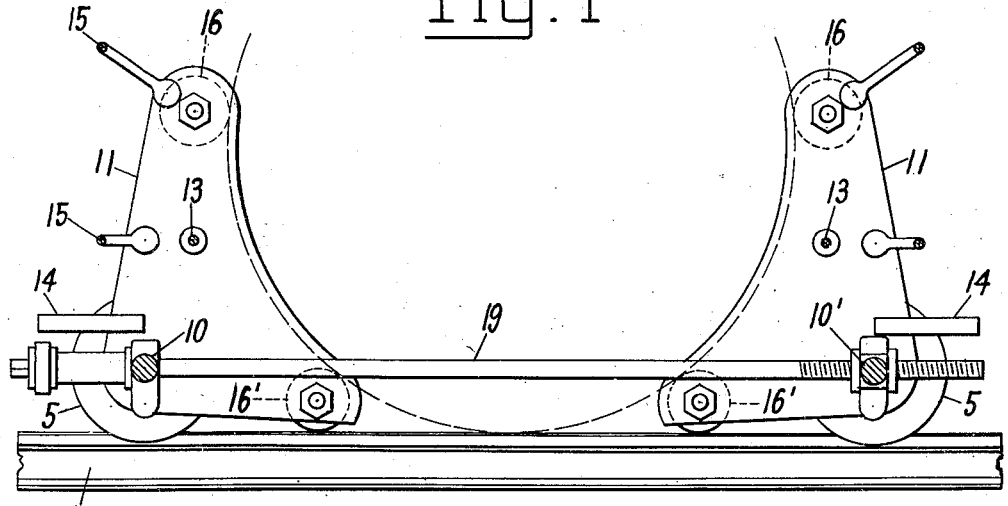
Fig. 2 is a longitudinal section of the carrier in position to elevate a driving wheel assembly, the latter being indicated in broken lines.

Two freely rotatable rollers 16 and 16' are mounted between the plates 11 of each side frame, the roller 16 being positioned at the upper end of the frame and the roller 16' at the lower inner corner, as clearly shown in Figs. 1 and 2, said rollers being mounted on spindles 17 passing through the plates 11 and held in place by nuts 18. The rollers 16 and 16' are positioned for contact with the treads of the driving wheels 7 when the two dollies are moved into the position shown in Fig. 2, one in front and the other in the rear of the driving wheel assembly. The lower rollers 16' rest and roll on the rails 6 and assist the wheels 5 in supporting the dollies to keep them from upsetting while being moved into said position.

Figure 3:
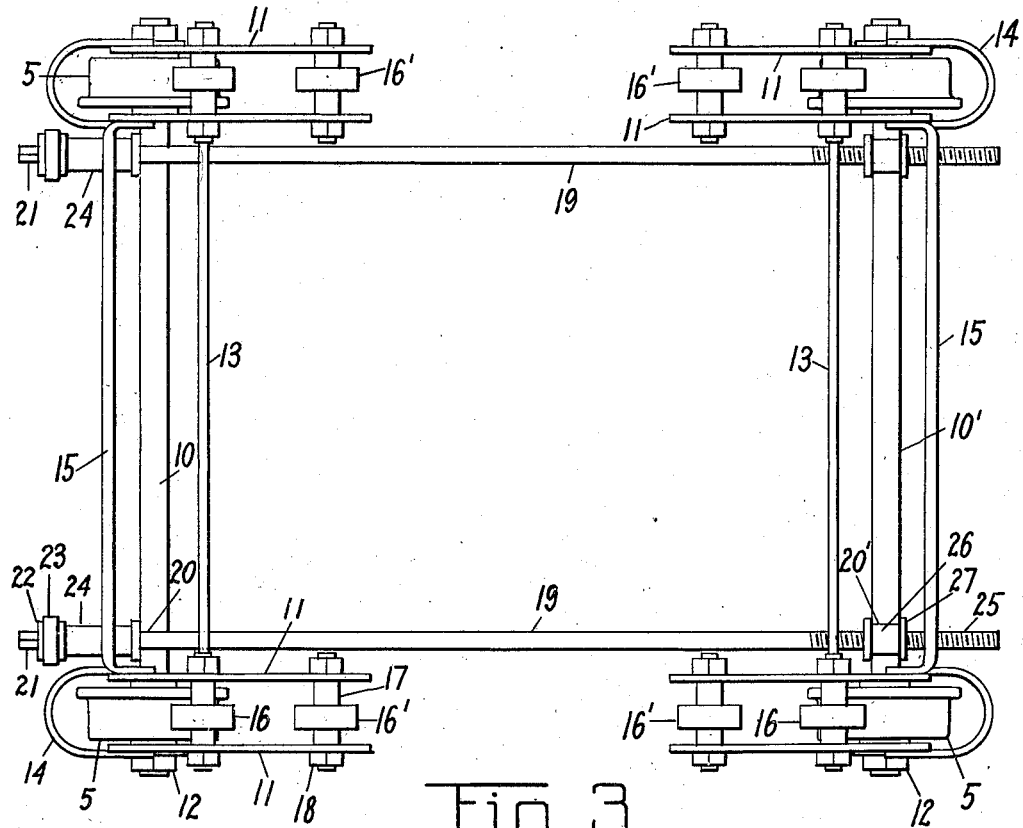
Fig. 3 is a plan view of the carrier alone.
Figure 4:
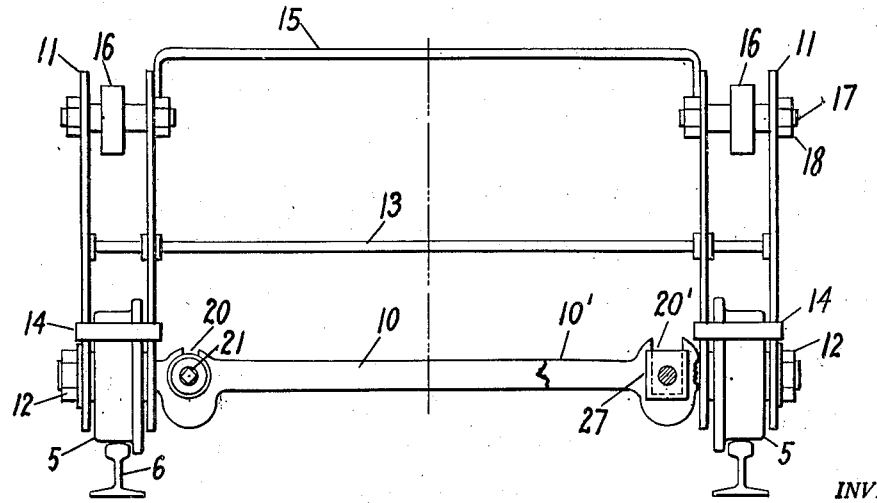
Fig. 4 is an end elevation of the carrier alone, as viewed from the left of Fig. 1, the front axle being broken away at the right hand side to show the rear axle.

Two removable tie rods 19, one near each side, connect the two dollies together. The tie rods, which are identical, rest in and extend through notches 20 and 20' formed respectively in the axles 10 and 10' of the front and rear dollies. Each tie rod has its front end squared, as at 21, to receive a wrench, and is formed with a collar 22. A thrust bearing 23 which may be a ball bearing if desired, surrounds the rod behind the collar 22, and a tubular spacer 24 extends from said thrust bearing to the front axle 10. The rod 19 is freely rotatable in said spacer 24, and is not threaded therein. The rod is round where it passes through the notch 20 in said axle, and is rotatable therein. The rear end of the rod 19 is threaded, as at 25, and is screwed through a nut 26. The nut is square in cross section and has flanges 27 at its ends, and rests in the notch 20' in the rear axle 10'. The nut 26 is therefore held from turning and from sliding longitudinally, so that when the rod is turned, in the proper direction, the two axles are moved toward each other. In order to accommodate the nuts 26, the notches 20' in the axle 10' of the rear dolly are larger than the notches 20 in the axle 10 of the front dolly, as shown in Figs. 3 and 4, this being the difference in the two dollies referred to previously. In Fig. 4, the front axle 10, which with its notch 20 is shown at the left, has been broken away at the right to show the rear axle 10' and its notch 20'.

In using the carrier, the two dollies, without the tie rods 19, are separately moved into their respective positions, one in front of the driving wheel assembly and the other in the rear thereof, with their wheels 5 resting on the rails 6 and their rollers 16 and 16' in contact with the treads of the driving wheels. The lower rollers 16' are also resting on the rails. The tie rods 19, with their assembled thrust bearings and spacers 23 and 24 and nuts 26, are then passed through above the dolly axles 10 and 10', and are fitted into the notches 20 and 20' of said axles, the parts then occupying the positions shown in Fig. 2. The tie rods are then turned, by means of wrenches applied to their projecting squared front ends 21, and as the axles 10 and 10' are drawn toward each other, the lower rollers 16' are elevated, raising the driving wheel assembly to the position shown in Fig. 1. The entire weight, both of the driving wheel assembly and of the carrier, is supported on the carrier wheels 5, and the carrier with its load can be rolled as a unit along the rails.

The lifting effect set up by shortening the rods 19 is caused by the relative positions of the rollers 16 and 16' and the carrier wheels 5. As the axles 10 and 10' are moved toward each other by the rods 19, the driving wheel holds the upper rollers 16 apart. The triangular plates 11, therefore, rotate slightly about the axles 10 and 10', causing the lower rollers 16' and the driving wheel to be lifted off the rail. There is a minimum of friction, because there is rolling movement at all heavily loaded points of contact.

I claim:

1. A driving wheel carrier adapted to roll upon a flat surface and comprising two dollies positioned one on each side of the driving wheel, each dolly comprising a wheel rolling upon said flat surface and supporting the dolly, a frame rotatable about the axis of said supporting wheel, a roller mounted in the lower portion of said frame, said roller being positioned for contact with said flat surface and with the periphery of the driving wheel at the lower portion thereof, and a member mounted on said frame above said supporting wheel for contact with the periphery of said driving wheel above the point of contact of said roller; and a connection between the two dollies, said connection including means for moving the two dollies toward each other, whereby to rock said frames about the axes of said supporting wheels to cause said rollers to raise the driving wheel off the flat surface.

2. A carrier for a driving wheel assembly adapted to roll upon a flat surface and comprising two dollies positioned one on each side of the driving wheel assembly, each dolly comprising an axle, a pair of wheels thereon rolling upon said flat surface and supporting the dolly, frames mounted on said axle and rotatable about the axis of said supporting wheels, rollers mounted in said frames, said rollers being positioned for contact with said flat surface and with the periphery of each driving wheel near the bottom thereof, and members mounted on said frames above said axles and said rollers for contact with the peripheries of said driving wheels above the points of contact of said rollers; and a connection between said axles, said connection including means for moving the two dollies toward each other, whereby to rock said frames about said axles to cause said rollers to raise the driving wheel assembly.

3. A carrier for a driving wheel assembly comprising two dollies positioned one on each side of the driving wheel assembly, each dolly comprising an axle having a notch formed therein, a pair of wheels thereon for supporting the dolly, frames mounted on said axle and rotatable about the axis of said supporting wheels, rollers mounted in said frames for contact with the periphery of each driving wheel near the bottom thereof, and members mounted on said frames above said axles and said rollers for contact with the peripheries of said driving wheels above the points of contact of said rollers; and a removable rod forming a connection between the axles of both dollies, the end portions of said rod passing through and engaging said notches, and said rod including screw and nut means for shortening said connection to move the two dollies toward each other, whereby to tilt said frames about said axles to cause said rollers to raise the driving wheel assembly.

4. A carrier for a round object comprising two dollies positioned one on each side of the object, each dolly comprising an axle, wheels mounted thereon for supporting the dolly, a frame mounted on said axle and rotatable about the axis of said supporting wheels, at least two rollers mounted on said frame for contact with the periphery of the object, said rollers and said axle being positioned at the apices of a triangle and one of said rollers being above the other roller and above said axle; a removable tie rod extending between the axles of both dollies, one end portion of said rod being rotatably connected with one axle and the other end portion being threaded, and a nut removably mounted on the other axle and threaded upon said rod, whereby rotation of said rod moves the dollies toward each other and tilts said frames to cause the lower rollers to raise the object.

SETH T. COUCH.

REFERENCES CITED

The following references are of record in the file of this patent:

UNITED STATES PATENTS

| Number | Name | Date |
| --- | --- | --- |
| 1,275,716 | Maurer | Aug. 13, 1918 |
| 2,171,093 | Klima et al. | Aug. 29, 1939 |
| 2,252,534 | Trotter | Aug. 12, 1941 |
| 2,332,443 | Foringer | Oct. 19, 1943 |
| 2,357,633 | Cowgill | Sept. 5, 1944 |
| 2,380,415 | Carruthers | July 31, 1945 |

FOREIGN PATENTS

| Number | Country | Date |
| --- | --- | --- |
| 687,558 | Germany | Feb. 1, 1940 |